United States Patent [19]

Kuribara et al.

[11] Patent Number: 5,398,516
[45] Date of Patent: Mar. 21, 1995

[54] METHOD AND APPARATUS FOR DETECTING AN INSUFFICIENCY OF REFRIGERANT IN AN AIRCONDITIONING APPARATUS

[75] Inventors: Masaru Kuribara; Kazumitsu Kobayashi, both of Atsugi, Japan

[73] Assignee: Unisia Jecs Corporation, Atsugi, Japan

[21] Appl. No.: 150,071
[22] PCT Filed: Mar. 31, 1993
[86] PCT No.: PCT/JP93/00409
  § 371 Date: Nov. 22, 1993
  § 102(e) Date: Nov. 22, 1993
[87] PCT Pub. No.: WO93/20393
  PCT Pub. Date: Oct. 14, 1993

[30] Foreign Application Priority Data

Mar. 31, 1992 [JP] Japan .................. 4-105554

[51] Int. Cl.⁶ .............................................. F24F 11/00
[52] U.S. Cl. .................................................... 62/129
[58] Field of Search ............... 62/129, 133, 125, 126, 62/127

[56] References Cited

U.S. PATENT DOCUMENTS 3,059,443 10/1962 Garner ........................... 62/129 X
4,167,858 9/1979 Kojima et al. ................... 62/129 X
5,214,918 6/1993 Oguni et al. ..................... 62/129 X

FOREIGN PATENT DOCUMENTS 54-28050  2/1979 Japan .
56-64261  6/1981 Japan .
61-17876  1/1986 Japan .
3-199873  8/1991 Japan .
3-294771 12/1991 Japan .
4-217762  8/1992 Japan .
5-180546  5/1993 Japan .

Primary Examiner—Harry B. Tanner
Attorney, Agent, or Firm—Foley & Lardner

[57] ABSTRACT

A refrigerant sensor which generates an output corresponding to the amount of liquid phase refrigerant in contact with the sensor is provided in a closed refrigerant circulation circuit of an air conditioning apparatus. A refrigerant insufficiency is detected by sensing a rotational speed of a compressor and comparing the refrigerant sensor output with a judgment value set to correspond to the rotational speed. As a result, even if the liquid surface of refrigerant in the refrigerant sensor fluctuates corresponding to an increase in rotational speed of the compressor, and an output value greater than that for the actual refrigerant fill amount is generated, since the judgment value is set to counterbalance this, a refrigerant insufficiency can be accurately detected. Moreover, problems such as seizing of the compressor due to the refrigerant insufficiency can be reliably prevented.

6 Claims, 6 Drawing Sheets

METHOD AND APPARATUS FOR DETECTING AN INSUFFICIENCY OF REFRIGERANT IN AN AIRCONDITIONING APPARATUS

TECHNICAL FIELD

The present invention relates to technology for the high accuracy detection of an insufficiency of refrigerant in airconditioning apparatus suitable for use in automotive cooling equipment and the like.

BACKGROUND ART

In general with air conditioning equipment, a refrigerant sensor is installed in a closed circuit in which refrigerant is circulated, to detect if the amount of refrigerant in the closed circuit is sufficient or insufficient. The present inventors have proposed a refrigerant sensor, as disclosed in pending Japanese Patent Application No. 3-357552 (referred to as prior art in the following) which comprises a sensor body having a refrigerant flow path portion for the passage of refrigerant, provided in a flow path between a condenser and evaporator in a cooling cycle, a refrigerant chamber located in the sensor body above the refrigerant flow path portion and communicated with the interior of the refrigerant flow path portion, and a thermo-sensitive device provided inside the refrigerant chamber for detecting if refrigerant inside the chamber is in a liquid phase condition.

The refrigerant sensor constructed as above is fitted to piping between a receiver tank which holds the liquid phase refrigerant condensed by the airconditioning equipment condenser, and an expansion valve whereby liquid phase refrigerant is expanded and evaporated. With drive to the air conditioning equipment, the compressor comes into operation, and if the refrigerant circulating in the cooling cycle is filled to a sufficient amount, the interior of the refrigerant flow path portion of the refrigerant sensor is filled with the liquid phase refrigerant flowing there through until the surface of the liquid reaches the upper surface of the refrigerant chamber interior.

At this time, since the thermo-sensitive device inside the refrigerant chamber is immersed in the liquid phase refrigerant, there is a significant cooling effect due to the refrigerant, so that the resistance value of components such as a thermistor which make tip the thermo-sensitive device is maintained at a low temperature value. However, if the amount of refrigerant in the cooling cycle is diminished due to refrigerant leakage etc., the liquid level of refrigerant inside the refrigerant chamber is lowered and the thermo-sensitive device exposed above the refrigerant liquid surface. Since the cooling effect of gaseous phase refrigerant is less than that of liquid phase refrigerant, the temperature of the thermo-sensitive device rises, with a consequent change in resistance, causing a change in the current flowing through a warning device, thereby bringing on a light notifying of the refrigerant deficiency.

With the refrigerant sensor according to the above prior art, upward or downward movement of the liquid surface of the refrigerant in the refrigerant chamber is possible even with no change in refrigerant quantity, due to fluctuations in the pressure of refrigerant in the piping caused by a change in compressor rotational speed (with an automotive compressor, due to a change in rotational speed of the engine driving the compressor). As a result, the level of the liquid surface of the refrigerant becomes greater than or less than that of the thermo-sensitive device, immersing or exposing the device, with a consequent change in cooling effect.

Hence, when a refrigerant deficiency is detected with a refrigerant sensor which uses for example a thermistor having a higher resistance at lower temperatures for the thermo-sensitive device, then the characteristics as shown in FIG. 6 are obtained. In this figure, the compressor rotational speed is represented by tile horizontal axis, tile current I in the warning device circuit is represented by the vertical axis, and tile characteristic curves B10, B20, B40, B60, B80, B100, and B120 show the characteristics for respective refrigerant fill percentages ranging from 10, 20, 40, 60, 80, 100 to 120% with 100% being the ideal. The 10 current value in FIG. 6 is the value for the case when the warning device activates a tamp or the like to give a refrigerant insufficiency warning.

With such a refrigerant sensor, even if there is a sufficient fill amount inside the cooling cycle 1, with a refrigerant F fill percentage of 60% for example as shown by tile characteristic line B60, then if the compressor rotational speed N is less than approximately 2000 rpm, a refrigerant insufficiency is reported due to an insufficiency condition. However, by increasing the rotational speed, a sufficient condition is erroneously sensed and the refrigerant insufficiency warning is canceled. Moreover, for the case at the extreme end of the graph with the low refrigerant fill percentage characteristic line B10, if the compressor rotational speed N is above approximately 5000 rpm, then in spite of the fact that a refrigerant insufficiency condition exists, it is not possible to accurately judge if a sufficient or insufficient condition exists.

In view of the above mentioned problems with the refrigerant insufficiency detector for airconditioning apparatus, it is an object of the present invention to provide a refrigerant insufficiency detection method and apparatus for an airconditioning apparatus which can accurately detect an insufficiency condition in the fill amount of refrigerant irrespective of compressor rotational speed.

It is a further object of the present invention to accurately detect a refrigerant insufficiency so as to reliably prevent unloaded operation of the compressor, and prevent problems such as seizing of the compressor.

DISCLOSURE OF THE INVENTION

In order to solve the above problems, the present invention provides a method and apparatus for detecting insufficiency of refrigerant in an airconditioning apparatus which comprises refrigerant circulation piping, and a compressor, condenser and evaporator provided successively along the piping in a direction of circulation of refrigerant in the piping, a refrigerant sensor being provided in the piping at a location between the evaporator and the condenser, the refrigerant sensor generating an output value corresponding to an amount of contact of liquid state refrigerant, a refrigerant insufficiency being detected on the basis of a signal from the refrigerant sensor, the method and apparatus including; a refrigerant insufficiency judgment step or means which judges a refrigerant insufficiency by comparing the refrigerant sensor output value with a judgment value, a rotational speed detection step or means which detects a rotational speed of the compressor, and a judgment value setting step or means which sets the judgment value of the refrigerant insufficiency judgment step or means to correspond to the compressor rotational speed.

With the above construction, when the amount of liquid phase refrigerant in contact with the refrigerant sensor varies with an increase in the compressor rotational speed, the output signal from the refrigerant sensor indicates that the amount of refrigerant is in excess of the actual refrigerant fill amount. However, since the judgment value corresponding to the compressor rotational speed is set to balance the change amount in the refrigerant sensor output value, comparison of the sensor output with the judgment value enables a refrigerant insufficiency condition can be detected to a high accuracy without influence from the rotational speed of the compressor.

Moreover, the construction of the before mentioned refrigerant sensor may comprise a sensor body having a refrigerant flow path portion disposed within the piping, a refrigerant chamber disposed within the sensor body at a location above the refrigerant flow path portion, and communicated with the refrigerant flow path portion, and a thermo-sensitive device provided inside the refrigerant chamber for detecting if refrigerant inside the chamber is in a liquid phase condition.

By using a refrigerant sensor of the above construction having a thermo-sensitive device to detect if refrigerant entering the refrigerant chamber above the refrigerant flow path portion is in a liquid phase condition, refrigerant flow is not affected, and highly accurate detection of the refrigerant is possible.

The communication between the refrigerant chamber and the refrigerant flow path portion in the refrigerant sensor may be via a small diameter constricting aperture. With such a construction, the small diameter constricting aperture causes a resistance to the flow of refrigerant from the piping into the refrigerant chamber and from the refrigerant chamber into the piping. As a result transient changes in the amount of refrigerant in the refrigerant chamber can be suppressed so that detection accuracy can be further increased.

BEST MODE FOR CARRYING OUT THE INVENTION

As follows is a description of the embodiments of the present invention with reference to FIGS. 1 to 5. First a description of a first embodiment of the present invention will be given with reference to FIGS. 1 to 4.

Figure 1:
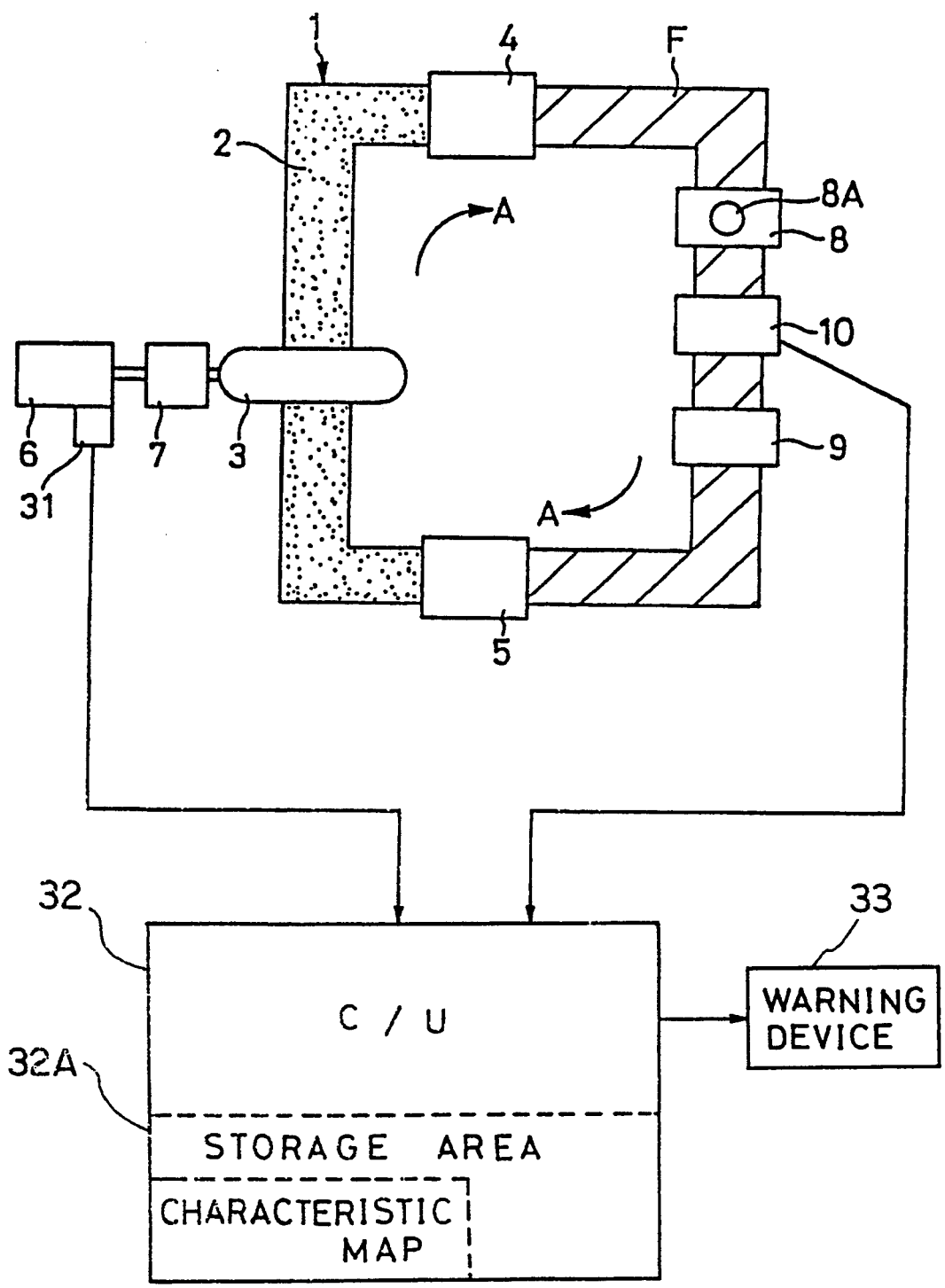
FIG. 1 is a schematic diagram illustrating the structure of a system according to a first embodiment of the present invention.

As shown in FIG. 1, a closed refrigerant circulating circuit 1 in an automotive airconditioning apparatus comprises piping 2 which forms a circulation circuit in which a refrigerant F such as ammonia or freon gas is circulated, with a compressor 3, condenser 4 and evaporator 5 provided successively along the piping 2 in the direction of circulation of the refrigerant F (indicated by arrow A in FIG. 1). The evaporator 5 is disposed with its heat absorbing surface facing into the drive compartment of a vehicle (not shown in the figure), while the compressor 3 is connected to an engine 6 by way of a solenoid clutch 7 so that the rotation of the engine 6 is transmitted to the compressor 3. The refrigerant F is compressed by the compressor 3, and undergoes successive phase transformations while flowing through the condenser 4 and evaporator 5, changing from a pressurized gas to a pressurized liquid and then to a low pressure gas. While changing from a liquid to a gas in the evaporator 5, heat is absorbed from the drive compartment thereby cooling the drive compartment interior.

Here the compressor 3 is connected to the engine 6 by way of the solenoid clutch 7, with the solenoid clutch 7 transmitting the rotation of the engine 6 to the compressor 3. The solenoid clutch 7 is engaged for example, by switching on an airconditioning switch (not shown in the figure) so that the rotation of the engine 6 is transmitted to the compressor 3 thereby driving the compressor 3.

A receiver tank 8 is provided in the piping 2 at a location between the condenser 4 and evaporator 5, for temporarily holding refrigerant F which has become liquid phase state. The receiver tank 8 is provided with a viewing window 8A whereby the liquid condition of the refrigerant F therein may be observed.

An expansion valve 9 is provided in tile piping 2 at a location between the receiver tank 8 and the evaporator 5. The expansion valve 9 comprises a pressure reducing valve which reduces the pressure of liquid phase state refrigerant F discharging from tile receiver tank 8 to a predetermined pressure so that it flows in tile direction indicated by arrow A. The refrigerant F which has been reduced in pressure by the expansion valve 9 evaporates as it flows through the evaporator 5, changing to the gaseous phase condition, and is subsequently recompressed by the compressor 3.

A refrigerant sensor 10 is provided in the piping 2 at a location between the receiver tank 8 and the expansion valve 9. The refrigerant sensor 10, as shown in FIG. 2, generally comprises a sensor body 11 to be described later, which forms the outer shape of the refrigerant sensor 10, a refrigerant flow path portion 12 formed so as to pass through the sensor body 11, a refrigerant chamber 17 formed in the sensor body 11 at a location above the refrigerant flow path portion 12 and communicated with the refrigerant flow path portion 12 by way of a restrictor portion 14, and a thermistor 18 provided inside the refrigerant chamber 17.

Figure 2:
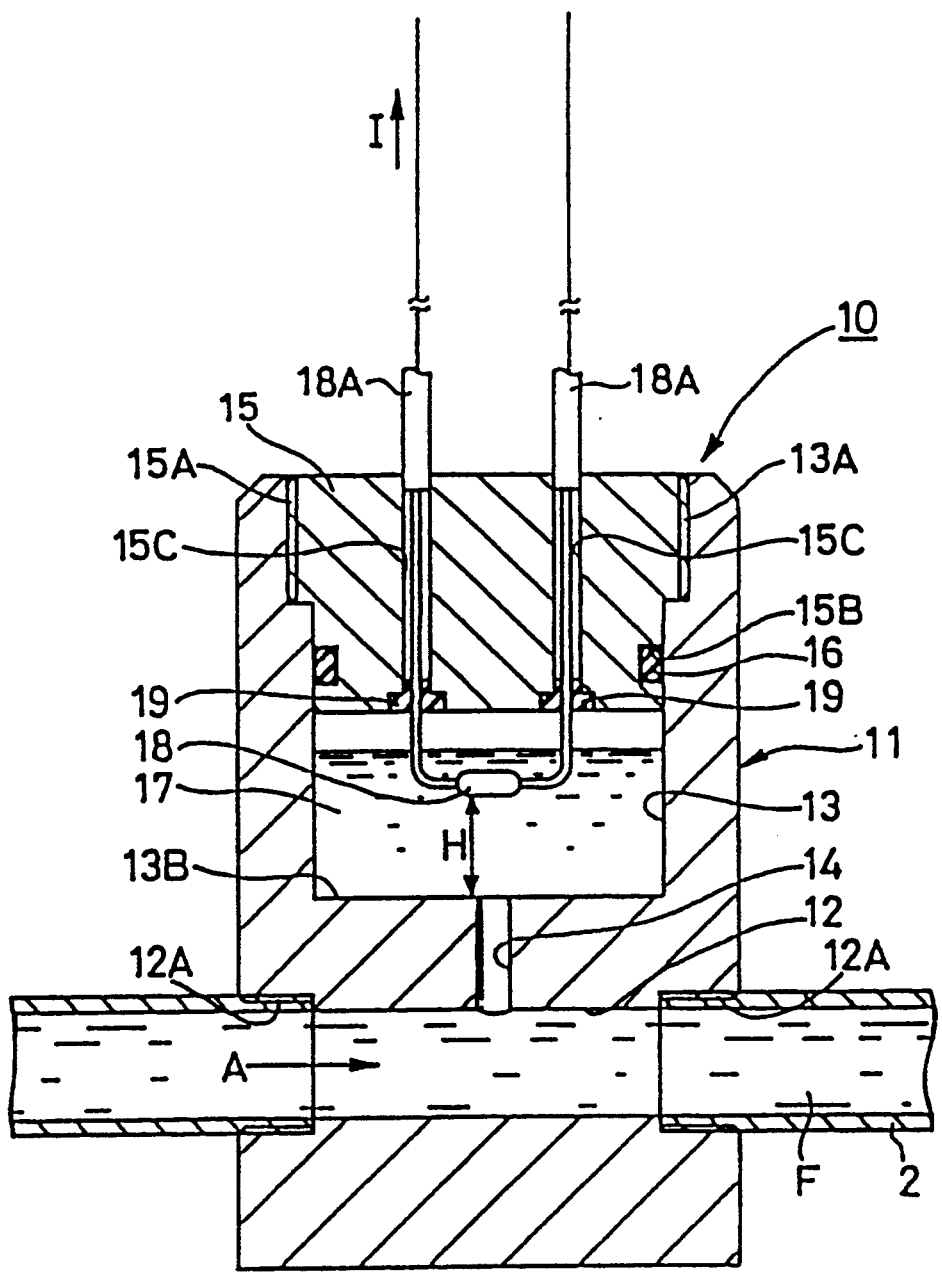
FIG. 2 is a longitudinal sectional view showing the internal structure of a refrigerant sensor used in the first embodiment.

The sensor body 11 is formed in the rectangular parallel piped shape of the refrigerant sensor 10 exterior, and is generally provided with the refrigerant flow path portion 12 passing through the sensor body 11 from the left side face to the right side face as shown in FIG. 2, and formed with female threaded portions 12A, 12A on inner peripheral surfaces of both ends thereof, and a large diameter opening 13 formed at a location above the refrigerant flow path portion 12, having a female threaded portion 13A on an inner peripheral surface of an entrance portion, and the small diameter restrictor portion 14 formed so as to communicate between a bottom portloft 13B of the large diameter opening 13 and the before-mentioned refrigerant flow path portion 12.

Piping 2 is threaded into both female threaded portions 12A in the refrigerant flow path 12 so that the refrigerant F in tile cooling cycle 1 is communicated with the refrigerant flow path 12.

Furthermore a cover 15 is provided to cover the large diameter opening 13. The cover 15 is cylindrically shaped with a male threaded portion 15A formed on an outer peripheral surface at an upper end thereof, and an O-ring groove 15B formed on an outer peripheral surface at a lower end thereof. A pair of electrical lead apertures 15C, 15C are drilled axially through the cover 15 in diametrically spaced apart- relation to each other. An O-ring 16 is fitted into the O-ring groove 15B, thereby sealing the large diameter opening 13.

The refrigerant chamber 17 is formed between the cover 15 and the bottom portion 13B of the large diameter opening 13. The refrigerant chamber 17 is formed by threading tile male threaded portion 15A of the cover 15 into the female threaded portion 13A of the large diameter opening 13 in the sensor body 11, and is communicated with the refrigerant flow path portion 12 by way of the before mentioned restrictor portion 14.

A thermo-sensitive device in the form of the thermistor 18 is disposed inside the refrigerant chamber 17. The thermistor 18 is attached to the cover 15 by inserting leads 18A, 18A into the before mentioned respective lead apertures 15C in tile cover 15 using stepped cylindrically shaped seal members 19, 19. The respective leads 18A pass to the outside of the refrigerant sensor 10 and are connected to an externally mounted warning device 33 to be described later. The thermistor 18 is positionally located inside the refrigerant chamber 17 so as to be spaced a predetermined height H above the bottom 13B of the large diameter opening 13.

In this embodiment the thermistor 18 exhibits characteristics such that when it is self heated as a result of a current I flowing in the respective leads 18A, the temperature rises and the resistance value drops, while with external cooling at this time the temperature drops and the resistance value increases.

A rotational speed detecting sensor 31 is provided on the engine 6. The rotational speed detecting sensor 31 detects the rotational speed of the engine 6 thereby detecting tile rotational speed N of the compressor 3 which is connected to the engine 6 by way of the solenoid clutch 7.

Figure 4:
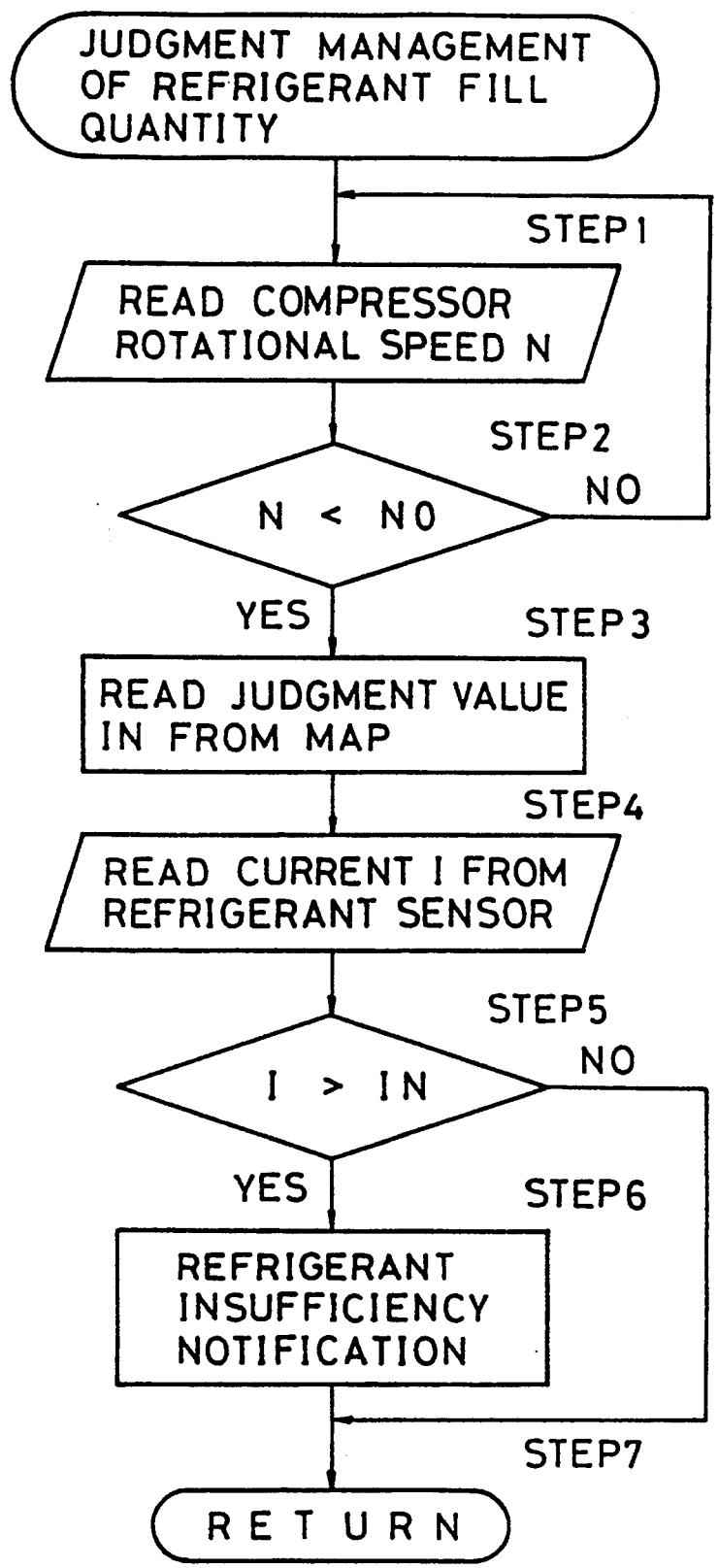
FIG. 4 is a flow chart illustrating a refrigerant insufficiency detection routine according to the first embodiment.

A control unit 32 is provided for judging an insufficiency of refrigerant filling the closed refrigerant circuit of the airconditioning apparatus, on the basis of signals from the various sensors. The input side of the control unit 32 is connected to the respective leads 18A of the refrigerant sensor provided in the piping 2, and to the rotational speed detecting sensor 31, while the output side is connected to the warning device 33 comprising a device such as a lamp. Furthermore, a refrigerant fill quantity judgment management program as shown in FIG. 4 is incorporated into tile control unit 32, and a characteristic map such as shown in PIG. 3 together with information such as reference rotational speeds N0 calculated from the characteristic map are stored in a storage area 32A of the control unit 32.

The characteristic map shows tile characteristic curves for each of the rotational speeds N of tile compressor 3, with the refrigerant fill percentage B taking the horizontal axis, and the output current I from the refrigerant sensor 10 taking tile vertical axis.

Figure 6:
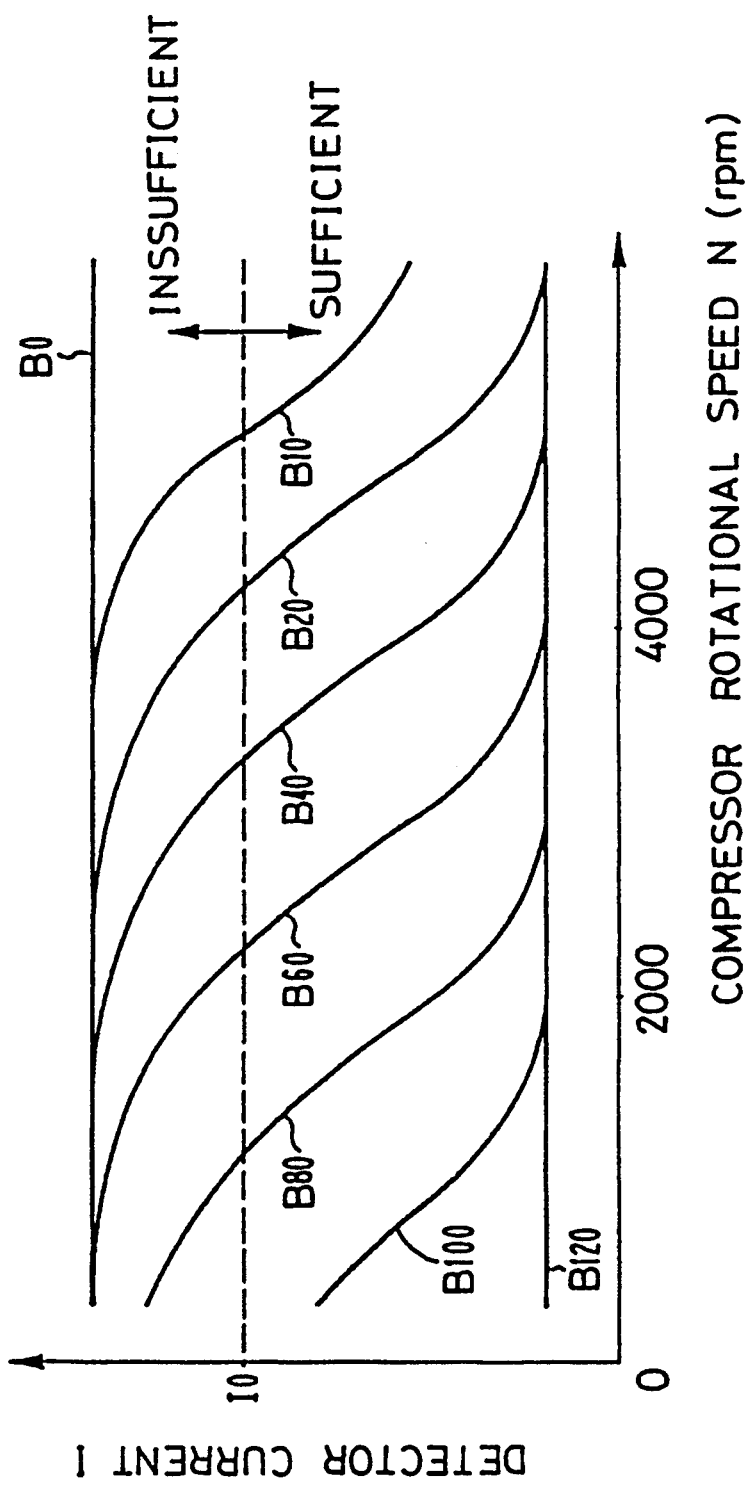
FIG. 6 is a diagram illustrating characteristic curves of refrigerant sensor detection current for each refrigerant fill percentage.

Assuming a refrigerant fill percentage of 80% to be a sufficient fill percentage, then with reference to the before mentioned diagram of FIG. 6, the region to the left of the characteristic curve B80 can be considered a sufficient fill region and the region to the right a region of refrigerant insufficiency. On the other hand, referring to the characteristic map of FIG. 3, it can be seen that on the 80% refrigerant fill percentage line, when the compressor 3 rotational speed is less than 3,000 rpm, the detection current I is variable, while for speeds above 3,000 rpm the output current I remains constant.

In this case, with the present embodiment, since the refrigerant fill percentage B80 line is set for judging if the refrigerant fill amount is sufficient or insufficient, then when the compressor 3 rotational speed N increases above 3,000 rpm, judgment management cannot be carried out using the detected current I, judgment only being possible when the speed is less than 3,000 rpm. Thus the rotational speed of 3,000 rpm is stored in the storage area 32A as time reference rotational speed N0.

Figure 3:
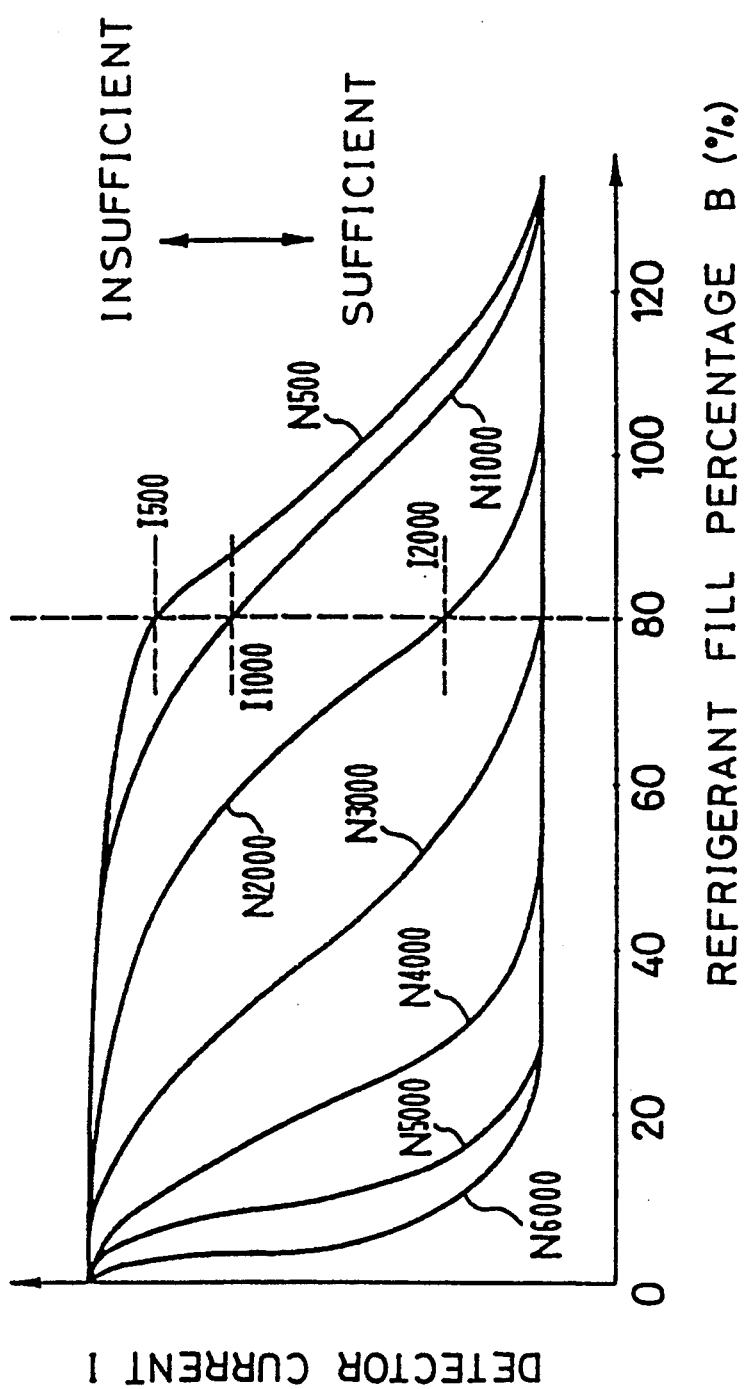
FIG. 3 is a characteristic diagram illustrating characteristic maps for determining a refrigerant insufficiency condition in tile first embodiment.

With the characteristic map of FIG. 3, the judgment value with respect to the output current I is set by the refrigerant fill percentage B80 line as judgment values 1500, 11000, 12000, to 13000 for respective compressor 3 rotational speeds of N500, N1000, N2000 to N3000. Here the respective judgment values 1500, to 13000 are referred to in general as judgment values IN.

The airconditioning apparatus according to the present embodiment is constructed in this way, while the judgment management of the refrigerant fill quantity is according to the following description with reference to FIG. 4.

At first, in step 1 the compressor 3 rotational speed N, corresponding to the engine 6 rotational speed is calculated by reading the rotational speed of the engine 6 from the rotational speed detecting sensor 31. That is to say, the rotational speed detecting sensor 31 and the function of step 1 comprise the rotational speed detection means.

In step 2 judgment is made of whether or not the rotational speed N is smaller than the reference rotational speed N0. If the judgment is "NO" (N>N0), control returns to step 1 and execution of judgment management of refrigerant fill amount in step 3 and subsequent steps is inhibited.

On the other hand, if the judgment in step 2 is "YES" (N<N0), control proceeds to step 3, and the judgment value IN corresponding to the rotational speed N is read from the characteristic map. That is to say, the characteristic map and function of step 2 comprise the judgment value setting means.

In step 4 the current I from the thermistor 18 of the refrigerant sensor 10 is read, and in step 5 judgment is made to determine whether or not the current I is greater than the judgment value IN.

If the judgment of step 5 is "YES" (I>IN), then there is an insufficiency condition for the refrigerant F in the closed refrigerant circulation circuit 1 and as a result the warning device 33 is operated to notify the operator of the refrigerant insufficiency. Control is then returned in step 7.

With the refrigerant F fill amount in such an insufficient condition, then even when the pressure of refrigerant F in the piping 2 fluctuates with change in rotational speed N of compressor 3, causing the liquid level of refrigerant F inside the refrigerant chamber 17 to fluctuate up and down, since the judgment value IN is set to correspond to the rotational speed, erroneous notification that a sufficient fill condition exists in spite of the refrigerant insufficiency, can be reliably prevented. Moreover, by inhibiting the judgment management when the rotational speed is above the reference rotational speed N0, a more accurate judgment of the fill condition of the refrigerant F inside the cooling cycle 1 is possible.

By setting the judgment value IN corresponding to the rotational speed N of the compressor 3 from the characteristic map, then an erroneous notification that a sufficient condition exists in spite of the fill amount of refrigerant F in the cooling cycle 1 being insufficient, can be reliably prevented so that an erroneous warning from the warning device 33 can be avoided. Moreover, no load operation of the compressor 3 can be reliably prevented so that problems such as seizing of the compressor 3 can be avoided, and protection of the compressor 3 effectively managed.

Furthermore, the thermistor 18 is disposed at a predetermined height H inside the refrigerant chamber 17. Since this height H can be suitably set in relation to the disposition of refrigerant sensor 10 and in relation to the arrangement of the piping 2 of the closed refrigerant circulation circuit 1, a certain degree of freedom in adjustment of the refrigerant insufficiency detection sensitivity is possible. With adjustment however, since the detection characteristics of the refrigerant sensor 10 will be different, the characteristic map must be recreated.

Figure 5:
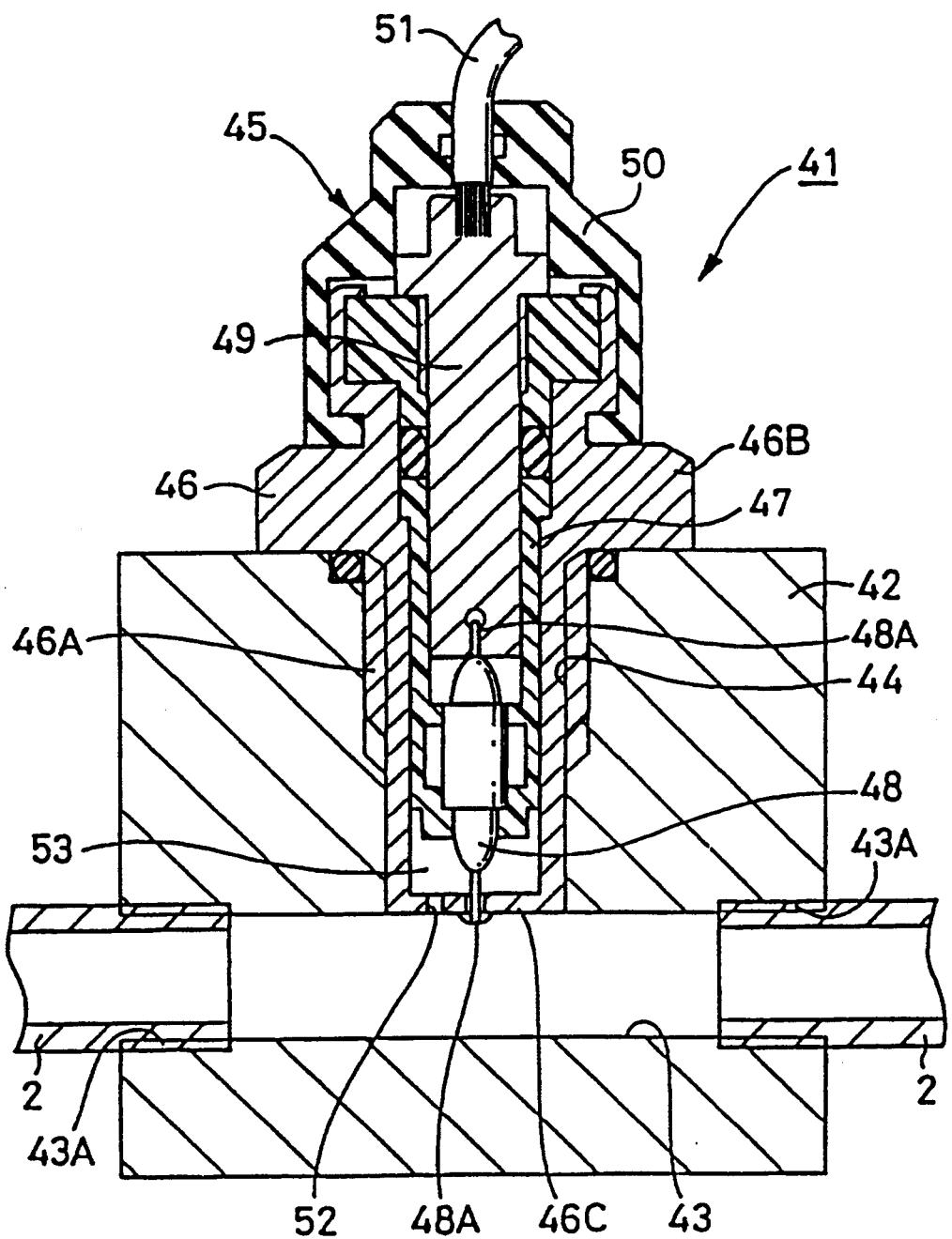
FIG. 5 is a longitudinal sectional view illustrating a refrigerant sensor according to a second embodiment of the present invention.

Next a description of a second embodiment according to the present invention will be given with reference to FIG. 5. A feature of this embodiment is the use of a sensor which is an improvement over a sensor for detecting a remaining refrigerant amount disclosed in unexamined Japanese patent publication No. 3-199873. Components having the same construction as those of the first embodiment are indicated by the same symbol and description is omitted.

The refrigerant sensor 41 generally comprises a coupling member 42 (to be described later) and a bolt-shaped sensor portion 45 assembled to the coupling member 42.

The coupling member 42 which acts as a sensor body provided in the piping 2, comprises a refrigerant flow path 43 passing through the coupling member 42 from left to right, with threaded portions 43A, 43A formed in the left and right openings thereof for connection to the piping 2, and a sensor attachment opening 44, drilled axially from above so as to communicate with the refrigerant flow path 43, and formed with a female thread on an inner peripheral face thereof.

The sensor portion 45 has a metal tubular shaped closed bottom housing 46 formed with a male threaded portion 46A on an outer peripheral forward end thereof for threaded engagement with the sensor attachment opening 44, a bolt head portion 46B formed on a base end thereof, a cylindrical shaped sensor holder 47 made from a resin material inserted axially into the housing 46, a thermistor 48 acting as a thermo-sensitive device, positionally located at a tip end of the housing 46 with one lead 48A connected to a base plate 46C of the housing 46 and another lead 48B connected to an output terminal rod 49, a rubber bushing 50 which covers the open side of the housing 46 together with the output terminal rod 49, and a harness 51 for leading out a signal from the thermistor 48 by way of the bushing 50.

A small diameter restrictor aperture 52 is drilled in the base plate 46C of the housing 46, and a refrigerant chamber 53 is formed between the lower end of the sensor holder 47 and the base plate 46C of the housing 46. In the present embodiment, the thickness of the base plate 46C of the housing 46 is 0.5 mm and the diameter of the restrictor aperture 52 is set within the range from 0.15–0.6 ram.

The refrigerant sensor 41 constructed as above can detect in a similar manner to the detection operation of the refrigerant sensor 10 as discussed previously. When the refrigerant F in the cooling cycle 1 is filled sufficiently, it flows into the refrigerant chamber 53 by way of the restrictor aperture 52 and covers and cools the thermistor 48, thereby reducing the detection current from the sensor portion 45. However, in the case of insufficient refrigerant, since the refrigerant F does not infiltrate into the refrigerant chamber 53, the cooling effect rate for the thermistor 48 is reduced and the detection current from the sensor portion 45 increased.

Thus, even with the refrigerant sensor 41 of the present embodiment constructed as described above, when used for refrigerant insufficiency judgment management in a similar manner to the first embodiment, a characteristic map approximately the same as the characteristic map illustrated in FIG. 3 can be obtained. By carrying out the refrigerant insufficiency judgment management as shown in FIG. 4, on the basis of this characteristic map, then an operational effect similar to that of the first embodiment can be obtained.

Furthermore, by communicating between the refrigerant flow path 43 and the refrigerant chamber 53 by way of the small diameter restrictor aperture 52, a flow resistance can be imposed on the movement of the refrigerant F between the refrigerant chamber 53 and the refrigerant flow path 43. As a result, fluctuations of the liquid surface of refrigerant F inside the refrigerant chamber 53 due to variation in rotational speed of compressor 3 can be alleviated, and compared to the first embodiment, due to the additional functions of detecting a remaining refrigerant amount, a more accurate detection of fill quantity of refrigerant F is possible.

Moreover, with the present embodiment, since the refrigerant sensor 41 is constructed with the sensor portion 45 threadedly attached to the coupling member 42, the fitting and removal of the sensor portion 45 can be easily carried out so that maintenance/replacement of the refrigerant sensor 41 is possible.

In the above embodiments, detection of the rotational speed of the compressor 3 was described as being carried out by detecting the rotational speed of the engine 6 with the rotational speed detecting sensor 31. However the present invention is not limited to the above method, and rotational speed of the rotating shaft of the compressor 3 may be detected using a crank angle sensor, or by providing a rotational speed detecting sensor on the rotating shaft of the compressor 3.

Moreover, in the above embodiments, the warning device 33 for warning of a refrigerant F fill quantity insufficiency comprises a lamp, and warning is effected by the lamp coming on. However warning of a fill quantity insufficiency may be carried out using a program connected to a control unit and the like to stop the compressor 3, and incorporating a buzzer or synthesized voice into the warning device 33 so that warning can be effected by the sound of the buzzer or a voice.

As described above, with the present invention, the liquid phase refrigerant in the piping experiences fluctuations in pressure as a result of rotational speed of the compressor, so that the liquid surface of refrigerant inside the refrigerant sensor fluctuates up and down. The effect of this up/down fluctuation can be alleviated by setting the judgment value to correspond to the rotational speed of the compressor, so that if the refrigerant fill quantity is in a refrigerant insufficiency condition, an erroneous judgment of a sufficient condition can be reliably prevented. Accordingly, the judgment of a sufficient or insufficient refrigerant fill amount can be reliably determined irrespective of the rotational speed of the compressor.

Furthermore, by using a refrigerant sensor having the refrigerant chamber formed above the refrigerant flow path and in communication therewith, and a thermo-sensitive device disposed inside the refrigerant chamber, the refrigerant condition can be detected to a high accuracy without imposing any influence on the refrigerant flow.

Moreover, by communicating between the refrigerant flow path and the refrigerant chamber by way of a small diameter restrictor aperture, the up/down fluctuation of the refrigerant liquid surface inside the refrigerant chamber due to the rotational speed change of the compressor can be alleviated so that detection of the refrigerant fill amount can be more accurately carried out.

INDUSTRIAL AFFLICABIIITY

With the refrigerant insufficiency detector for airconditioning equipment according to the present invention as described above, an insufficiency in the fill amount of refrigerant can be detected with high accuracy without being influenced by the rotational speed of the compressor. Consequently a stable cooling performance applicable to an automotive airconditioning apparatus can be obtained, as well as protection of the compressor against problems such as seizing.

The claims defining the invention are:

1. A method for detecting an insufficiency of refrigerant in an airconditioning apparatus, said airconditioning apparatus comprising refrigerant circulation piping, and a compressor, condenser and evaporator provided successively along said piping in a direction of circulation of refrigerant in said piping, a refrigerant sensor being provided in said piping at a location between said evaporator and said condenser, said refrigerant sensor generating an output value corresponding to an amount of contact of liquid phase refrigerant, a refrigerant insufficiency being detected on the basis of a signal from said refrigerant sensor, said method including; a refrigerant insufficiency judgment step which judges a refrigerant insufficiency by comparing the refrigerant sensor output value with a judgment value, a rotational speed detection step which detects a rotational speed of the compressor, and a judgment value setting step which sets the judgment value of the refrigerant insufficiency judgment step to correspond to the compressor rotational speed.

2. A method for detecting an insufficiency of refrigerant in an airconditioning apparatus as claimed in claim 1, wherein said refrigerant sensor includes a sensor body having a refrigerant flow path disposed in said piping, a refrigerant chamber provided in the sensor body at a location above the refrigerant flow path and in communication with the refrigerant flow path, and a thermo-sensitive device provided inside the refrigerant chamber for detecting if refrigerant in the refrigerant chamber is in a liquid phase condition.

3. A method for detecting an insufficiency of refrigerant in an airconditioning apparatus as claimed in claim 2, wherein communication between the refrigerant chamber of said refrigerant sensor, and said refrigerant flow path is by way of a small diameter restrictor aperture.

4. An apparatus for detecting an insufficiency of refrigerant in an airconditioning apparatus, said airconditioning apparatus comprising refrigerant circulation piping, and a compressor, condenser and evaporator provided successively along said piping in a direction of circulation of refrigerant in said piping, a refrigerant sensor being provided in said piping at a location between said evaporator and said condenser, said refrigerant sensor generating an output value corresponding to an amount of contact of liquid phase refrigerant, a refrigerant insufficiency being detected on the basis of a signal from said refrigerant sensor, said apparatus including; a refrigerant insufficiency judgment means which judges a refrigerant insufficiency by comparing the refrigerant sensor output value with a judgment value, a rotational speed detection means which detects a rotational speed of the compressor, and a judgment value setting means which sets the judgment value of the refrigerant insufficiency judgment means to correspond to the compressor rotational speed.

5. An apparatus for detecting an insufficiency of refrigerant in an airconditioning apparatus as claimed in claim 4, wherein said refrigerant sensor includes a sensor body having a refrigerant flow path disposed in said piping, a refrigerant chamber provided in the sensor body a a location above the refrigerant flow path and in communication with the refrigerant flow path, and a thermo-sensitive device provided inside the refrigerant chamber for detecting if refrigerant in the refrigerant chamber is n a liquid phase condition.

6. An apparatus for detecting an insufficiency of refrigerant in an airconditioning apparatus as claimed in claim 5, wherein communication between the refrigerant chamber of said refrigerant sensor, and said refrigerant flow path is by way of a small diameter restrictor aperture.

* * * * *